US012589411B2

(12) United States Patent
Miwa et al.

(10) Patent No.: US 12,589,411 B2
(45) Date of Patent: Mar. 31, 2026

(54) SYSTEMS FOR ABSORBING FLEXURAL WAVES ACTING UPON A STRUCTURE USING MONOPOLE AND DIPOLE RESONANCE

(71) Applicants: Toyota Motor Engineering & Manufacturing North America, Inc, Plano, TX (US); Toyota Jidosha Kabushiki Kaisha, Toyota (JP)

(72) Inventors: Tomohiro Miwa, Toyota (JP); Miki Nakahara, Toyota (JP); Xiaoshi Su, Ann Arbor, MI (US); Debasish Banerjee, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 414 days.

(21) Appl. No.: 18/453,509

(22) Filed: Aug. 22, 2023

(65) Prior Publication Data

US 2025/0070747 A1 Feb. 27, 2025

(51) Int. Cl.
*B06B 1/02* (2006.01)

(52) U.S. Cl.
CPC ............ *B06B 1/02* (2013.01); *B06B 2201/20* (2013.01)

(58) Field of Classification Search
CPC .............................. B06B 1/02; B06B 2201/20
See application file for complete search history.

(56) References Cited

U.S. PATENT DOCUMENTS

| | | | | | |
|---|---|---|---|---|---|
| 2,840,179 | A | * | 6/1958 | Junger | E04B 1/8409 181/286 |
| 3,783,968 | A | * | 1/1974 | Derry | E01F 8/0052 D25/160 |
| 3,812,931 | A | * | 5/1974 | Hauskins, Jr. | E01F 8/0052 181/210 |
| 3,887,031 | A | * | 6/1975 | Wirt | G10K 11/172 181/292 |
| 4,095,669 | A | * | 6/1978 | Bond, Sr. | E01F 8/0052 181/210 |
| 4,143,495 | A | * | 3/1979 | Hintz | E01F 8/007 181/290 |
| 4,226,299 | A | * | 10/1980 | Hansen | E04B 1/86 181/295 |
| 4,899,498 | A | * | 2/1990 | Grieb | E01F 8/0017 52/145 |

(Continued)

FOREIGN PATENT DOCUMENTS

JP 2016109283 A 6/2016

OTHER PUBLICATIONS

Cao et al. "Perfect absorption of flexural waves induced by bound state in the continuum." Extreme Mechanics Letters 47 (2021): 101364.

(Continued)

*Primary Examiner* — Henry Y Liu
(74) *Attorney, Agent, or Firm* — Christopher G. Darrow; Darrow Mustafa PC

(57) ABSTRACT

Disclosed are systems and devices for absorbing flexural waves. In one example, a pair of scatterers for absorbing a flexural wave acting on a structure includes a monopole scatterer and a dipole scatterer configured to be mounted to the structure at the same location.

20 Claims, 10 Drawing Sheets

(56) References Cited

U.S. PATENT DOCUMENTS

| | | | | | |
|---|---|---|---|---|---|
| 5,137,111 | A * | 8/1992 | Diduck | G10K 11/16 | 181/295 |
| 5,220,535 | A * | 6/1993 | Brigham | G10K 11/172 | 367/1 |
| 5,329,073 | A * | 7/1994 | Shono | E01F 8/007 | 181/290 |
| 5,426,267 | A * | 6/1995 | Underhill | E01F 8/0011 | 181/290 |
| 5,491,310 | A * | 2/1996 | Jen | G10K 11/16 | 181/292 |
| 5,713,170 | A * | 2/1998 | Elmore | E01F 8/0017 | 52/258 |
| 5,714,917 | A * | 2/1998 | Ella | H03H 3/04 | 332/149 |
| 5,952,625 | A * | 9/1999 | Huff | F01N 1/06 | 181/266 |
| 6,167,985 | B1 * | 1/2001 | Van Ligten | G10K 11/172 | 181/286 |
| 6,598,717 | B1 * | 7/2003 | Wang | F16F 9/306 | 310/326 |
| 6,719,078 | B2 * | 4/2004 | Nakamura | F02M 35/10013 | 454/906 |
| 6,892,856 | B2 * | 5/2005 | Takahashi | G10K 11/172 | 181/284 |
| 6,988,057 | B2 * | 1/2006 | Huang | G10K 11/172 | 181/269 |
| 7,308,965 | B2 * | 12/2007 | Sapoval | E01F 8/0076 | 181/293 |
| 7,451,855 | B2 * | 11/2008 | Wang | G10K 11/16 | 52/145 |
| 7,464,790 | B2 * | 12/2008 | Kodama | G10K 11/172 | 181/290 |
| 7,520,370 | B2 * | 4/2009 | Gudim | E04B 1/8209 | 181/290 |
| 7,540,353 | B2 * | 6/2009 | Okawa | F02M 35/1266 | 123/184.57 |
| 7,604,094 | B2 * | 10/2009 | Magyari | G10K 11/20 | 181/294 |
| 7,819,224 | B2 * | 10/2010 | Borchers | F01D 25/30 | 181/292 |
| 8,011,472 | B2 * | 9/2011 | Tanase | G10K 11/172 | 181/290 |
| 8,018,127 | B2 * | 9/2011 | Kikushima | H03H 9/21 | 310/370 |
| 8,157,052 | B2 * | 4/2012 | Fujimori | G10K 11/175 | 181/295 |
| 8,183,746 | B2 * | 5/2012 | Rastegar | F42C 11/008 | 102/209 |
| 8,251,175 | B1 * | 8/2012 | Englert | E04B 9/045 | 52/145 |
| 8,381,872 | B2 * | 2/2013 | Alexander | G10K 11/162 | 52/145 |
| 8,714,303 | B2 * | 5/2014 | Honji | G10K 11/175 | 181/284 |
| 8,789,652 | B2 * | 7/2014 | Swallowe | G10K 11/172 | 181/295 |
| 8,919,491 | B2 * | 12/2014 | Trumler | F02M 35/1266 | 181/227 |
| 8,925,678 | B2 * | 1/2015 | Tizzoni | E01F 8/007 | 181/284 |
| 9,166,554 | B2 * | 10/2015 | Yamada | H03H 9/0519 | |
| 9,291,104 | B2 * | 3/2016 | Ito | F23M 20/005 | |
| 9,607,600 | B2 * | 3/2017 | Swallowe | G10K 11/172 | |
| 9,748,922 | B2 * | 8/2017 | Ishino | H03H 9/21 | |
| 9,765,516 | B2 * | 9/2017 | Van Dinther | E04B 1/8209 | |
| 9,837,982 | B2 * | 12/2017 | Il | H03H 9/0509 | |
| 10,050,602 | B2 * | 8/2018 | Nguyen | H03H 9/17 | |
| 10,352,210 | B2 * | 7/2019 | Hanschen | F01N 1/006 | |
| 10,373,599 | B2 * | 8/2019 | Hakuta | G10K 11/161 | |
| 10,399,134 | B2 * | 9/2019 | Fan | B21D 13/04 | |
| 10,699,688 | B2 * | 6/2020 | Elford | G10K 11/172 | |
| 10,714,070 | B1 * | 7/2020 | Su | G10K 11/175 | |
| 11,043,199 | B2 * | 6/2021 | Lee | G10K 11/172 | |
| 11,204,204 | B2 * | 12/2021 | Lee | F01N 1/023 | |
| 11,545,128 | B2 * | 1/2023 | Su | G10K 11/162 | |
| 11,555,280 | B2 * | 1/2023 | Su | E01F 8/0047 | |
| 11,557,271 | B2 * | 1/2023 | Su | B60R 13/0815 | |
| 11,776,521 | B2 * | 10/2023 | Su | F01N 1/02 | 181/286 |
| 11,776,522 | B2 * | 10/2023 | Su | G10K 11/162 | 181/286 |
| 11,854,522 | B2 * | 12/2023 | Su | B60R 13/0815 | |
| 12,029,628 | B2 * | 7/2024 | Jenkins | B29D 99/00 | |
| 12,349,594 | B2 * | 7/2025 | Li | F16F 15/002 | |
| 2002/0017426 | A1 * | 2/2002 | Takahashi | G10K 11/172 | 181/284 |
| 2005/0098379 | A1 * | 5/2005 | Sato | B60R 13/0815 | 181/295 |
| 2007/0210879 | A1 * | 9/2007 | Cardona | H03H 9/542 | 333/188 |
| 2009/0100925 | A1 * | 4/2009 | Difoggio | G01N 29/036 | 73/32 A |
| 2011/0227450 | A1 * | 9/2011 | Yamazaki | H03H 9/02125 | 310/318 |
| 2011/0227660 | A1 * | 9/2011 | Mikami | H03H 9/17 | 331/156 |
| 2013/0082571 | A1 * | 4/2013 | Tabata | H02N 2/188 | 310/319 |
| 2013/0199868 | A1 * | 8/2013 | Bergiadis | E04B 1/84 | 29/896.2 |
| 2013/0307290 | A1 * | 11/2013 | Ide | B60R 13/0815 | 181/176 |
| 2017/0263235 | A1 * | 9/2017 | Elford | G10K 11/172 | |
| 2018/0114517 | A1 * | 4/2018 | Yamazoe | E04B 1/994 | |
| 2018/0138886 | A1 * | 5/2018 | Yoon | G01H 1/00 | |
| 2019/0139529 | A1 * | 5/2019 | Viard | G10K 11/172 | |
| 2019/0189898 | A1 * | 6/2019 | Sieber | H10N 30/857 | |
| 2019/0206380 | A1 * | 7/2019 | Hakuta | G10K 11/162 | |
| 2019/0333491 | A1 * | 10/2019 | Lee | G10K 11/172 | |
| 2020/0149639 | A1 * | 5/2020 | Aikawa | F16F 15/007 | |
| 2020/0224810 | A1 * | 7/2020 | Hakuta | G10K 11/162 | |
| 2020/0284174 | A1 * | 9/2020 | Lee | F01N 1/023 | |
| 2020/0388265 | A1 * | 12/2020 | Su | G10K 11/175 | |
| 2021/0010977 | A1 * | 1/2021 | Lee | G01N 21/1702 | |
| 2021/0142773 | A1 * | 5/2021 | Su | B60R 13/08 | |
| 2021/0142777 | A1 * | 5/2021 | Su | G10K 11/20 | |
| 2021/0210061 | A1 * | 7/2021 | Su | G10K 11/172 | |
| 2021/0237394 | A1 * | 8/2021 | Huang | B32B 3/20 | |
| 2021/0381231 | A1 * | 12/2021 | Sheng | E04B 1/84 | |
| 2022/0098806 | A1 * | 3/2022 | Su | B64F 1/26 | |
| 2022/0148554 | A1 * | 5/2022 | Su | F24F 13/24 | |
| 2022/0148555 | A1 * | 5/2022 | Su | B60R 13/0815 | |
| 2022/0189446 | A1 * | 6/2022 | Su | F01N 1/02 | |
| 2022/0190231 | A1 * | 6/2022 | Li | H10N 30/302 | |

OTHER PUBLICATIONS

Ji et al. "Investigations on flexural wave propagation and attenuation in a modified one-dimensional acoustic black hole using a laser excitation technique." Mechanical systems and signal processing 104 (2018): 19-35.

Chen et al. "A programmable metasurface for real time control of broadband elastic rays." Smart Materials and Structures 27.11 (2018): 115011.

Li et al. "An active meta-layer for optimal flexural wave absorption and cloaking." Mechanical Systems and Signal Processing 149 (2021): 107324.

Cao et al. "Flexural wave absorption by lossy gradient elastic metasurface." Journal of the Mechanics and Physics of Solids 143 (2020): 104052.

Basu et al. "Microelectromechanical resonators for radio frequency communication applications." Microsystem technologies 17 (2011): pp. 1557-1580.

Li et al. "A self-adaptive metamaterial beam with digitally controlled resonators for subwavelength broadband flexural wave attenuation", Smart Materials and Structures 27, 045015, (2018) pp. 1-13.

Liu et al. Design guidelines for flexural wave attenuation of slender beams with local resonators, Physics Letters A 362, (2007) pp. 344-347.

(56) References Cited

OTHER PUBLICATIONS

D. Lapin, “A monopole-dipole resonator for flexural waves in a rod,” Acoustical Physics 50, 77 80 (2004).

* cited by examiner

SYSTEMS FOR ABSORBING FLEXURAL WAVES ACTING UPON A STRUCTURE USING MONOPOLE AND DIPOLE RESONANCE

TECHNICAL FIELD

The present disclosure generally relates to systems and devices for absorbing flexural waves acting upon a structure.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Flexural waves, sometimes called bending waves, deform the structure transversely as they propagate. Flexural waves are more complicated than compressional or shear waves and depend on material and geometric properties. Airborne noises can be created by flexural waves when an object comes into contact with a structure subjected to a flexural wave. Flexural vibrations of thin structures, such as beams, plates, and shells are the most common noise source caused by flexural waves.

Traditional sound absorption methods have been utilized to reduce noise caused by flexural waves, including installing sound absorbing materials that absorb radiated sound, applying damping materials to reduce vibration, and/or adding high-mass structures to prevent the passage of vibrations. However, these traditional sound absorption methods only reduce the airborne noise and do not significantly impact the flexural wave, which is the root cause of the airborne noise.

SUMMARY

This section generally summarizes the disclosure and is not a comprehensive disclosure of its full scope or all its features.

In one example, a pair of scatterers for absorbing a flexural wave acting on a structure includes a monopole scatterer and a dipole scatterer configured to be mounted to the structure at the same location. The monopole scatterer and the dipole scatterer may have resonant frequencies similar to the flexural wave acting upon the structure.

In another example, relating to a system, a pair of scatterers include a monopole scatterer disposed on the structure at a location and a dipole scatterer disposed on the structure at the same location. Like before, the monopole scatterer and the dipole scatterer may have resonant frequencies similar to the flexural wave acting upon the structure.

Further areas of applicability and various methods of enhancing the disclosed technology will become apparent from the description provided. The description and specific examples in this summary are intended for illustration only and not to limit the scope of the present disclosure.

BRIEF DESCRIPTION OF THE DRAWINGS

The accompanying drawings, which are incorporated in and constitute a part of the specification, illustrate various systems and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are systems utilizing scatterers for absorbing flexural waves acting on a structure. Systems that utilize the scatterers may be able to absorb vibrations, including flexural waves in a beam or plate-like structure. In one example, the system utilizes two scatterers—a dipole scatterer with a dipolar resonance and a monopole scatterer with a monopolar resonance. The dipole scatterer and the monopole scatterer are generally located at the same location along the structure such that they overlap with each other and/or the origins of the resonances they produce are adjacent to each other. Each of the scatterers is capable of absorbing 50% of the energy carried by the incident waves. When both are attached to the same location of the structure, the absorption adds up to 100%.

Figure 1:
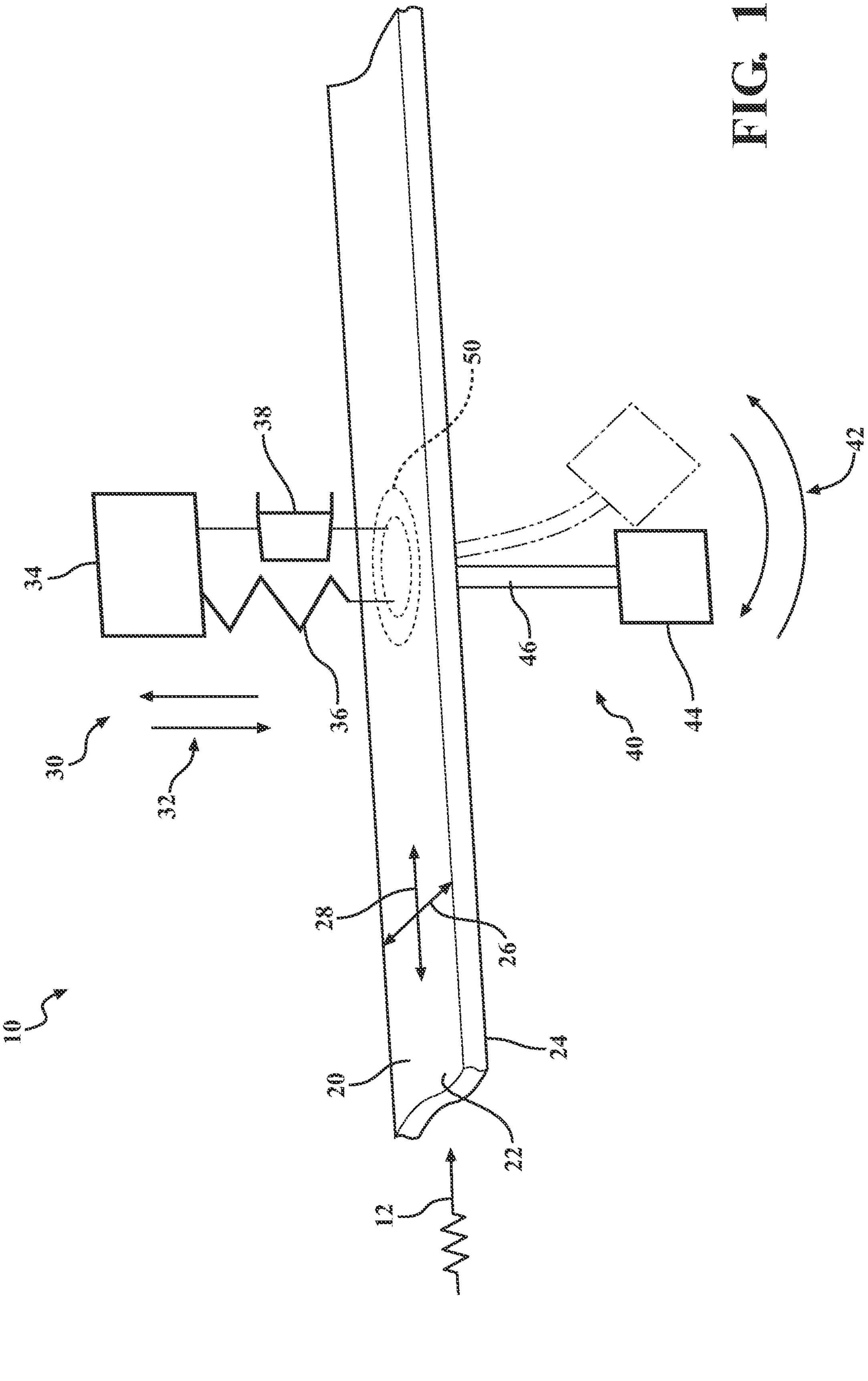
FIG. 1 illustrates a general design schematic that uses a dipole scatterer and a monopole scatterer to absorb flexural waves acting on a structure.

FIG. 1 illustrates a system 10 capable of absorbing a flexural wave acting upon a structure 20. In this example, the structure 20 is a beam, but, as explained later, the structure 20 may take any one of a number of different forms, such as plate-like structures. Here, the structure 10 has a top side 22 and a bottom side 24. As a structure 20 is a being, the beam has a width 26 and a length 28. The length 28 is the longer dimension of the structure 20, while the width 26 is the shorter dimension.

The system 10 includes a monopole scatterer 30 and a dipole scatterer 40 that are generally located at the same location 50 of the structure 20. In this example, the monopole scatterer 30 is attached to the top side 22 of the structure 20, while the dipole scatterer 40 is attached to the bottom side 24 of the structure 20. However, as explained later, the monopole scatterer 30 and the dipole scatterer 40 may be located on the same side of the structure 20. However, in either arrangement, the monopole scatterer 30 and the dipole scatterer 40 should be located at the same location 50. The monopole scatterer 30 generally resonates in an up-and-down direction 32 with respect to the top side 22 of the structure 20. In contrast, the dipole scatterer 40 generally resonates in a left and right direction 42.

The monopole scatterer 30 generally includes components that can be considered a mass 34, a spring 36, and a damper 38. As such, the monopole scatterer 30 may utilize a softer and lighter material as the spring 36 in the damper 38 and a stiffer and heavier part as the mass 34. The displacement of the structure 20 exerts a force on the monopole scatterer 30 so that it vibrates in the up-and-down direction 32, generating scattered waves propagating symmetrically to both sides of the monopole scatterer 30. Different examples of monopole scatterers will be provided later in this description.

The dipole scatterer 40 generally includes a mass 44 attached to an easy-to-bend structure 46 that acts as a bending spring. The easy-to-bend structure 46 may be accomplished by utilizing a low-stiffness material or thin thickness of the easy-to-bend structure 46. Some substantial damping (typically between 5% to 15%) may be needed in the easy-to-bend structure 46. The rotation of the structure 20 exerts a moment on the dipole scatterer 40 so that it vibrates in the back-and-forth direction 42 along the structure 20. This vibration then generates anti-symmetric scattered ways towards both sides of the dipole scatterer 40. Different examples of dipole scatterers will be provided later in this description.

The location 50 may be defined in a number of different ways. For example, location 50 may be a location of the structure 20 wherein the monopole scatterer 30 and the dipole scatterer 40 physically overlap each other along the length 28 of the structure 20. Moreover, the physical portions of the monopole scatterer 30 may overlap the physical portions of the dipole scatterer 40 and/or vice versa. Alternatively, the location 50 may be defined as a location where the origins of the resonances generated by the monopole scatterer 30 and the dipole scatterer 40 originate from. The location 50 may be where these origins are adjacent to or overlap.

As explained in more detail later, the resonant frequencies of the monopole scatterer 30 and the dipole scatterer 40 are generally substantially equal, i.e., within 20% of each other. Additionally, the frequency of the flexural wave 12 acting upon the structure 20 is also substantially equal, i.e., within 20%, of the resonant frequencies of the monopole scatterer 30 and the dipole scatterer 40. Each of the scatterers is capable of absorbing 50% of the energy carried by the incident waves. When both are attached to the same location of the structure, the absorption adds up to 100%.

Figure 2:
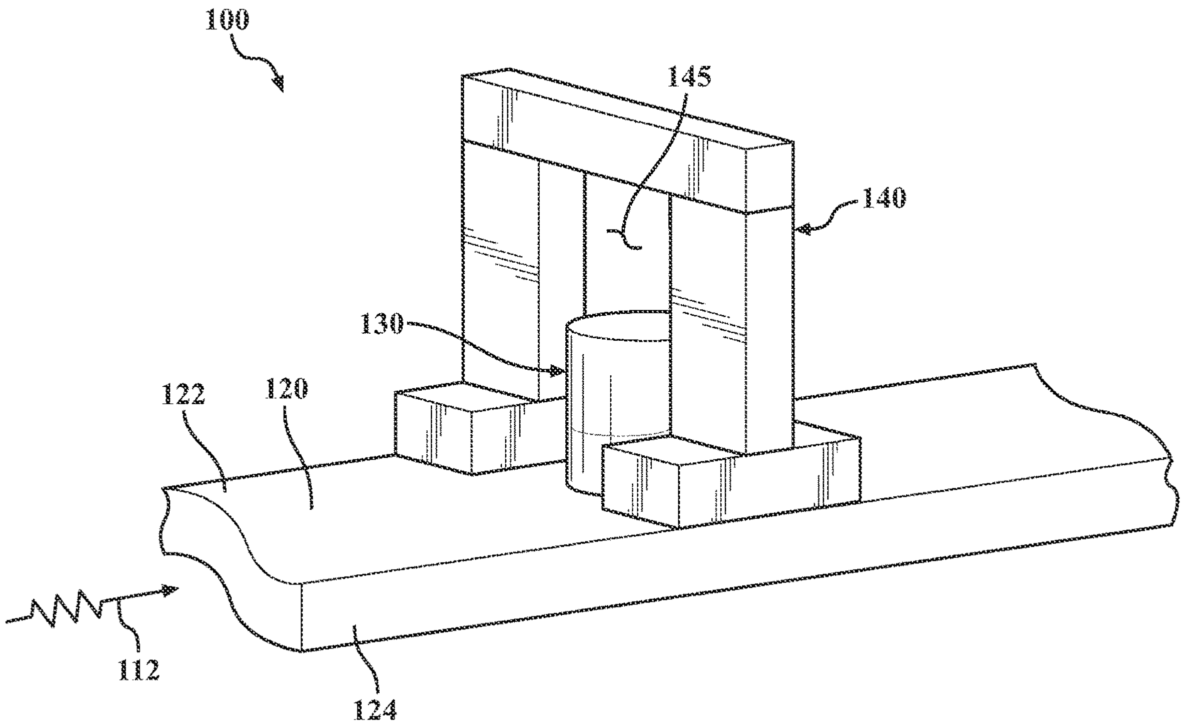
FIG. 2 illustrates a more detailed view of one example of a dipole scatterer and a monopole scatterer attached to a structure that can absorb flexural waves acting upon the structure.

FIG. 2 illustrates an example of a system 100 that is capable of absorbing flexural waves acting upon a structure 120. Like before, the structure 120 includes a top side 122 and a bottom side 124. In this example, a monopole scatterer 130 and a dipole scatterer 140 are both attached to the top side 122 of the structure 120. Again, like the example given in FIG. 1, the monopole scatterer 130 and the dipole scatterer 140 are both attached at the same location of the structure 120.

Figure 3A:
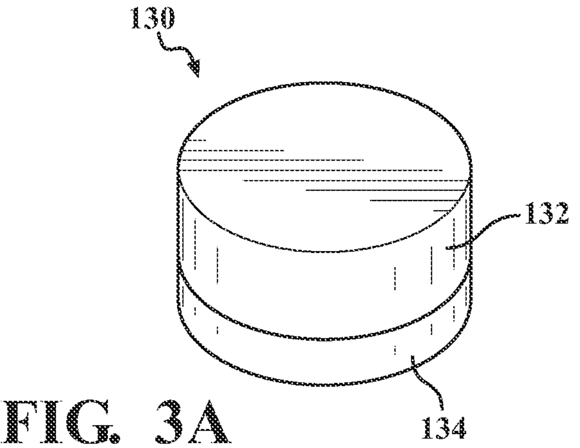
FIGS. 3A-3D illustrate examples of the monopole scatterer of FIG. 2.
Figure 3B:
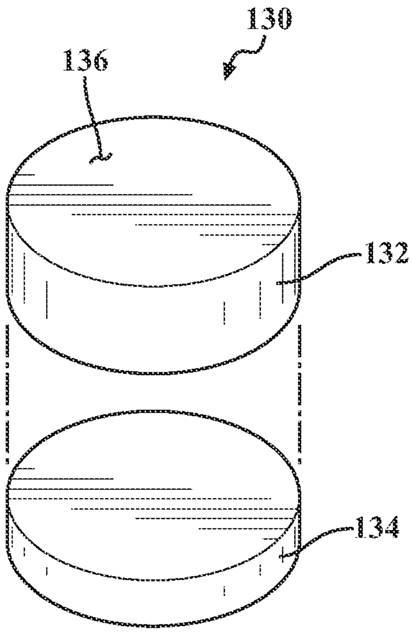

The monopole scatterer 130 is shown in more detail in FIGS. 3A and 3B. Here, the monopole scatterer 130 includes a solid member 132 and a flexible member 134. Generally, the solid member 132 acts as a mass in a mass-spring-damper system and may be made of a rigid material, such as steel, iron, aluminum, ceramics, plastics, etc. However, the solid member 132 may be made of any suitable material that allows the solid member 132 to act as a mass in a mass-spring-damper system.

As to the flexible member 134, the flexible member 134 acts as a spring and damper in a mass-spring-damper system and may be made of a flexible material, such as rubber and soft plastics, such as thermoplastic elastomers, and/or thermoplastic polyurethane. However, the flexible member may be made of any suitable material that allows the flexible member 134 to act as a spring and damper in a mass-spring-damper system.

The solid member 132 may be attached to the flexible member 134 using adhesives. However, the solid member 132 may be attached to the flexible member 134 using a number of different methodologies, such as press-fitting, over-molding, crimping, and/or using retainers, such as screws. The flexible member 134 may be attached to the structure 120 using similar methodologies, such as adhesives, press-fitting, over-molding, crimping, and/or using retainers, such as screws. When monopole scatterer 130 is attached to the structure 120, the flexible member 134 is located between the structure 120 and the solid member 132.

The monopole scatterer 130 may also have a cross-sectional area 136 that may be based on the width of the structure 120 of FIG. 2. Moreover, cross-sectional areas 136 of the solid member 132 and/or the flexible member 134 may be directly proportional to the width of the structure 120 of FIG. 2. In particular, the characteristic dimension of the cross-sectional area 136 is between 15% to 20% of the width of the structure 120 of FIG. 1.

The monopole scatterer 130 may have a resonant frequency substantially similar to the resonant frequency of the flexural wave acting upon the structure to which the monopole scatterer 130 is attached. Since the monopole scatterer 130 is a spring-mass-damper system, the lumped mass M of the solid member 132 may be represented as $M=\rho A h_1$, wherein $\rho$ is the density of the material that makes up the solid member 132, A is the cross-sectional area of the monopole scatterer 130 is (in particular, the cross-sectional area of the solid member 132), and $h_1$ is the height of the solid member 132. Since the mass of the flexible member 134 may be negligible, the mass of the solid member 132 could be taken as the mass of the monopole scatterer 130.

The lumped stiffness of the monopole scatterer 130 may be represented as $\kappa=EA/(\beta h_2)$, where E is the Young's modulus of the material that makes up the flexible member 134, A is the cross-sectional area of the monopole scatterer 130 (in particular, the cross-sectional area of the flexible member 134), and $h_2$ is the height of the flexible member 134. The damping property C of the material that makes up the flexible member 134 comes from the viscous damping in the material, which can be modeled as the imaginary part of Young's modulus.

Figure 3C:
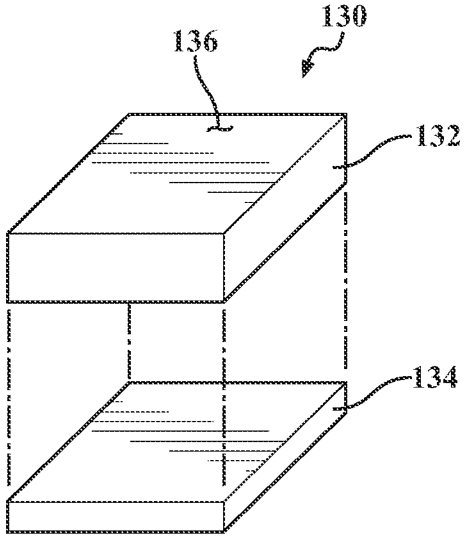
Figure 3D:
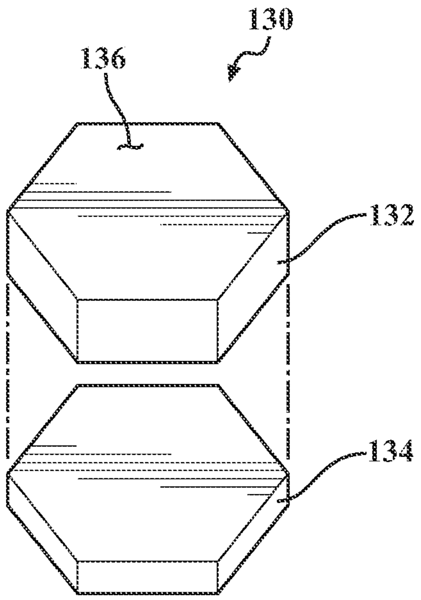
Figure 4A:
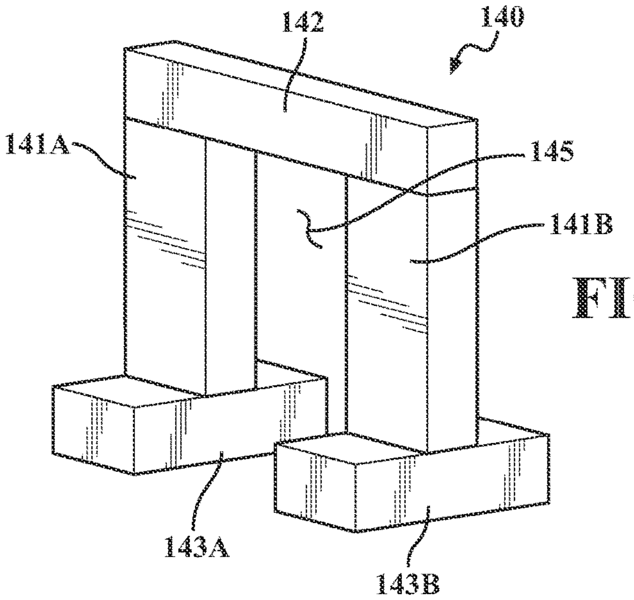
FIGS. 4A-4C illustrate one example of the dipole scatterer of FIG. 2.

It should be understood that the overall shape of the monopole scatterer 130 can vary from application to application. For example, FIG. 4A illustrates that the monopole scatterer 130 is substantially cylindrical, wherein both the solid member 132 and the flexible member 134 are cylindrical, giving both the solid member 132 and the flexible member 134 substantially circular cross-sectional areas. However, the monopole scatterer 130 can take other shapes as well. For example, FIG. 3C illustrates the monopole scatterer 130 as being cubic. FIG. 4D illustrates the monopole scatterer 130 being hexagonal. Again, the examples given in FIGS. 3A-3D are merely examples, and the monopole scatterer 130 can vary significantly.

Figure 4B:
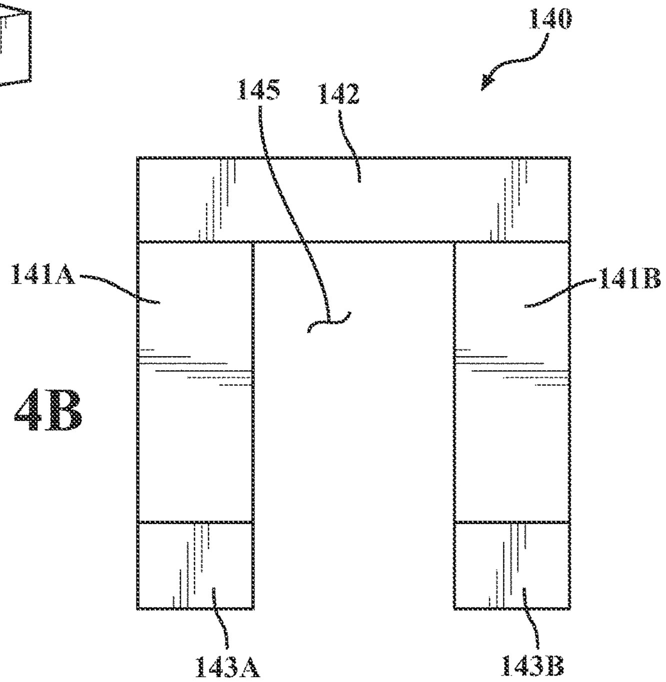
Figure 4C:
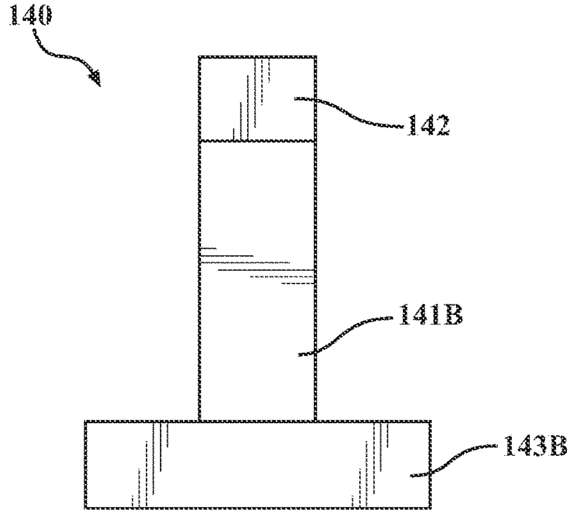

The dipole scatterer 140 is shown in more detail in FIGS. 4A-4C. As mentioned before, the dipole scatterer 140 scatter has a dipole resonance caused by the back-and-forth movement of the dipole scatterer 140. While the dipole scatterer 140 can vary from application to application, in this example, the dipole scatterer 140 includes a pair of support members 141A and 141B extending from the location of the structure 120 in a direction that is substantially perpendicular to a plane defined by the surface of the top side 122 of the structure 120. A mass member 142 may extend between the support members 141A and 141B. This type of arrangement defines an open space 145 between the pair of support members 141A and 141B, the mass member 142, and a portion of the structure 120. When assembled, as shown in FIG. 2, portions of the monopole scatterer 130 may be located within the open space 145. Each of the support members 141A and 141B may receive additional support from members 143A and 143B, respectively.

The support members 141A and 141B may be made of a material that allows for the support members 141A and 141B an easy-to-bend structure that allows for the back-and-forth movement of the mass member 142 upon a flexural wave acting on the structure 120. In some cases, the support members 141A and 141B may be made of plastic, acrylic, rubber, metals, or any other suitable material or combination thereof.

The mass member 142 acts as the mass from the dipole scatterer 140 and may be of any suitable material, such as plastic, acrylic, rubber, metals, or a combination thereof. In some cases, the mass member 142 and the support members 141A and 141B may be made of the same material. Further, in cases where they are made of the same materials, the mass member 142 and the support members 141A and 141B may be a single unitary structure or separate components adhered to or otherwise connected.

Referring back to FIG. 2, in this example, the system 100 is designed for flexural wave absorption near 2.7 kHz in a 2 cm wide 2 mm thick aluminum beam. As such, the structure 120, in this example, is made of aluminum and is 2 cm wide and 2 mm thick. The monopole scatterer 130 and the dipole scatterer 140 generally have resonant frequencies that are substantially equal. In this case, the monopole scatterer 130 and the dipole scatterer 140 have a resonance near 2.7 kHz, with the monopole scatterer 130 having a resonant frequency at 2625 Hz and scatters waves symmetrically towards the left and right sides. The dipole scatterer 140 has a resonant frequency of 2663 Hz and scatters waves towards the left and right sides with the opposite phases.

Figure 5:
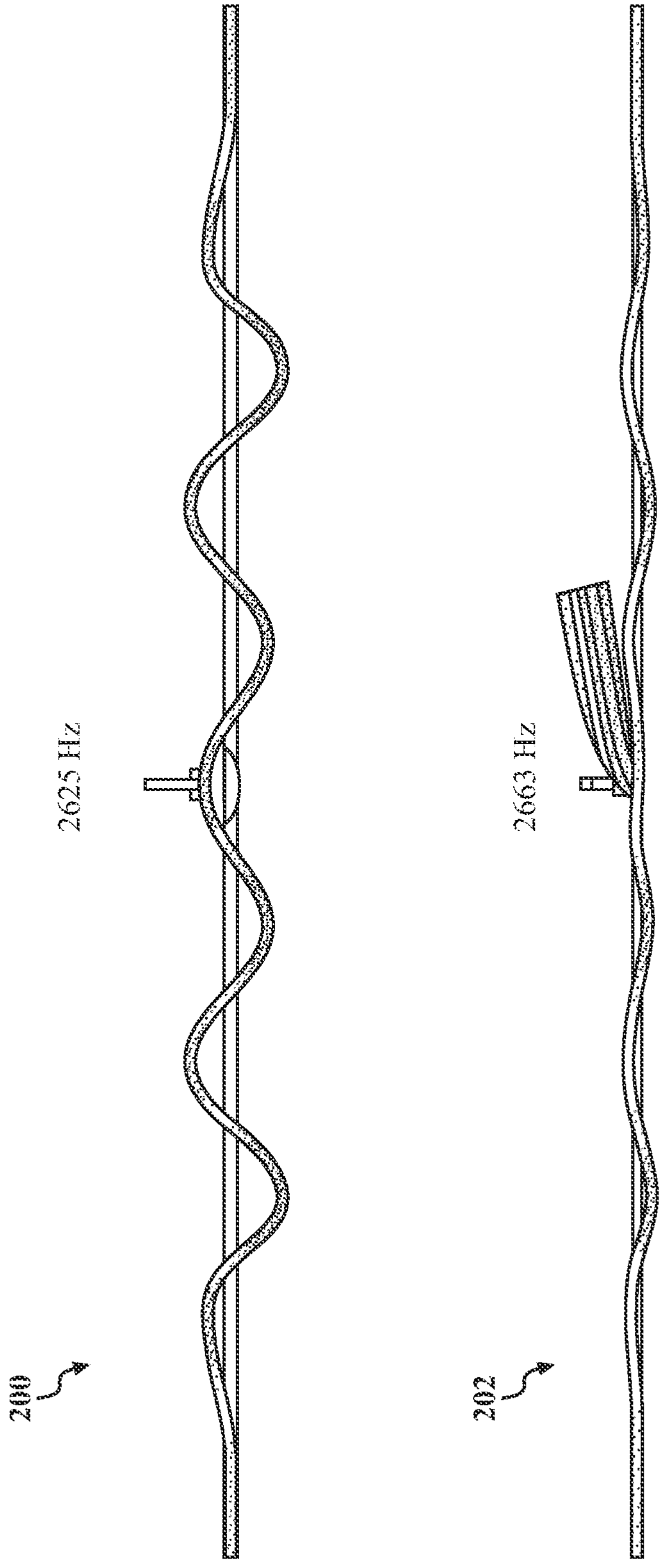
FIG. 5 illustrates the monopolar resonance of the monopole scatterer and the dipolar resonance of the dipole scatterer.

FIG. 5 illustrates the resonances produced by the monopole scatterer 130 and the dipole scatterer 140. More specifically, the resonance 200 is the monopole resonance produced by the monopole scatterer 130, while the resonance 202 is the dipolar resonance produced by the dipole scatterer 140. As mentioned, the monopole scatterer 130 and the dipole scatterer 140 can absorb 50% of the energy the incident waves carry. When both are attached to the same location of the structure, the absorption adds up to 100%.

Figure 6A:
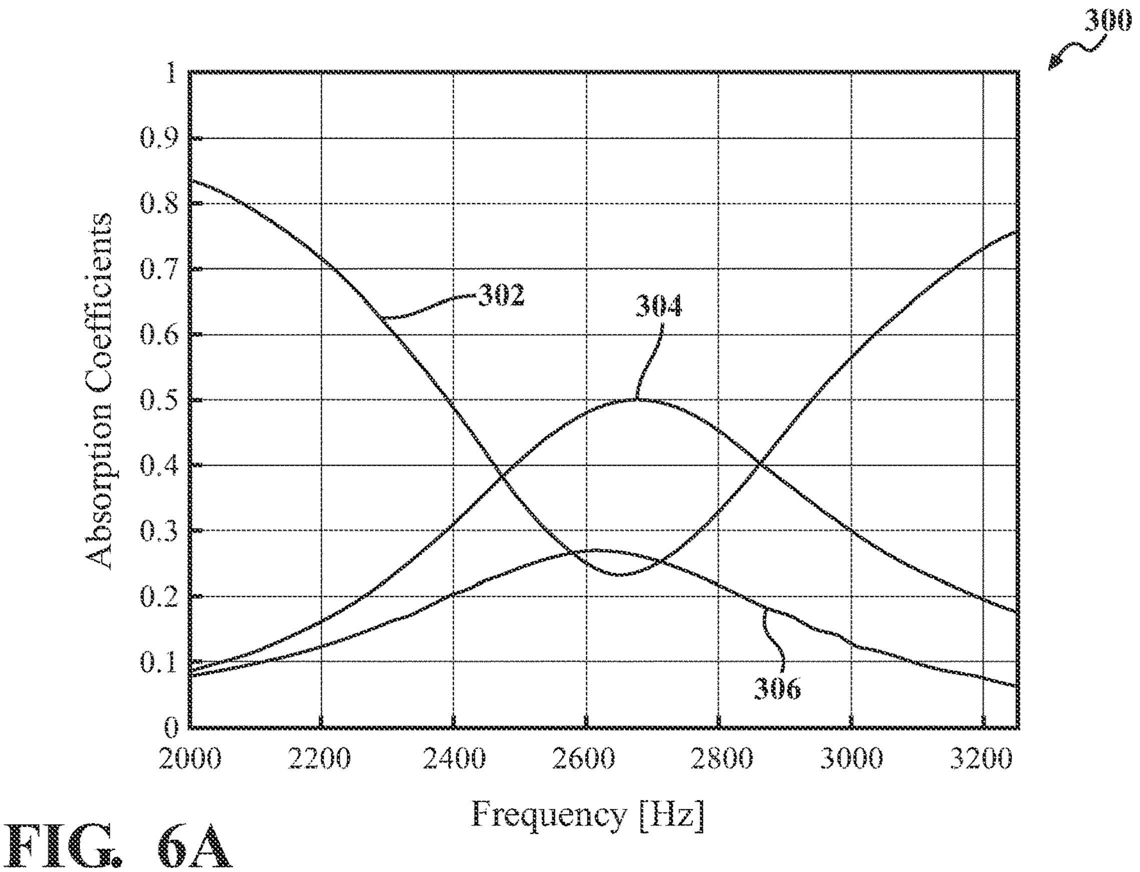
FIGS. 6A-6C illustrate the performance characteristics of the system of FIG. 2 for absorbing flexural waves.
Figure 6B:
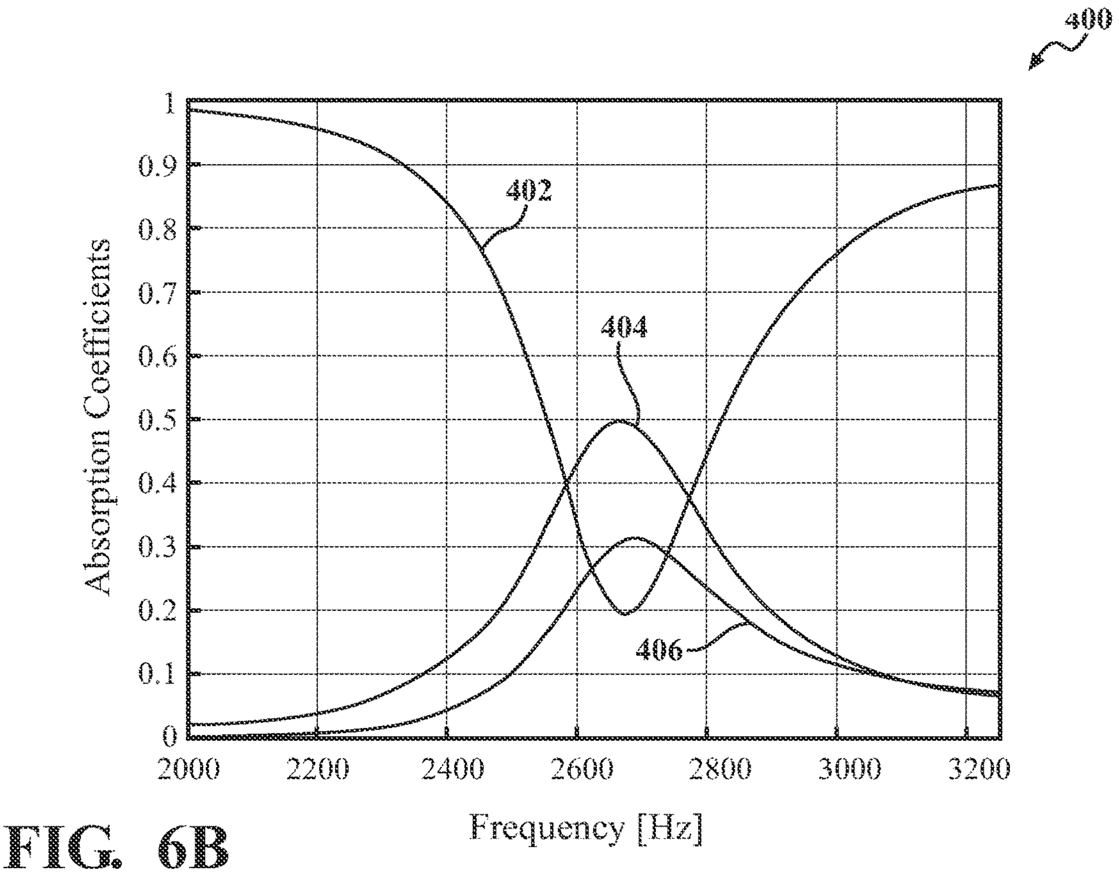
Figure 6C:
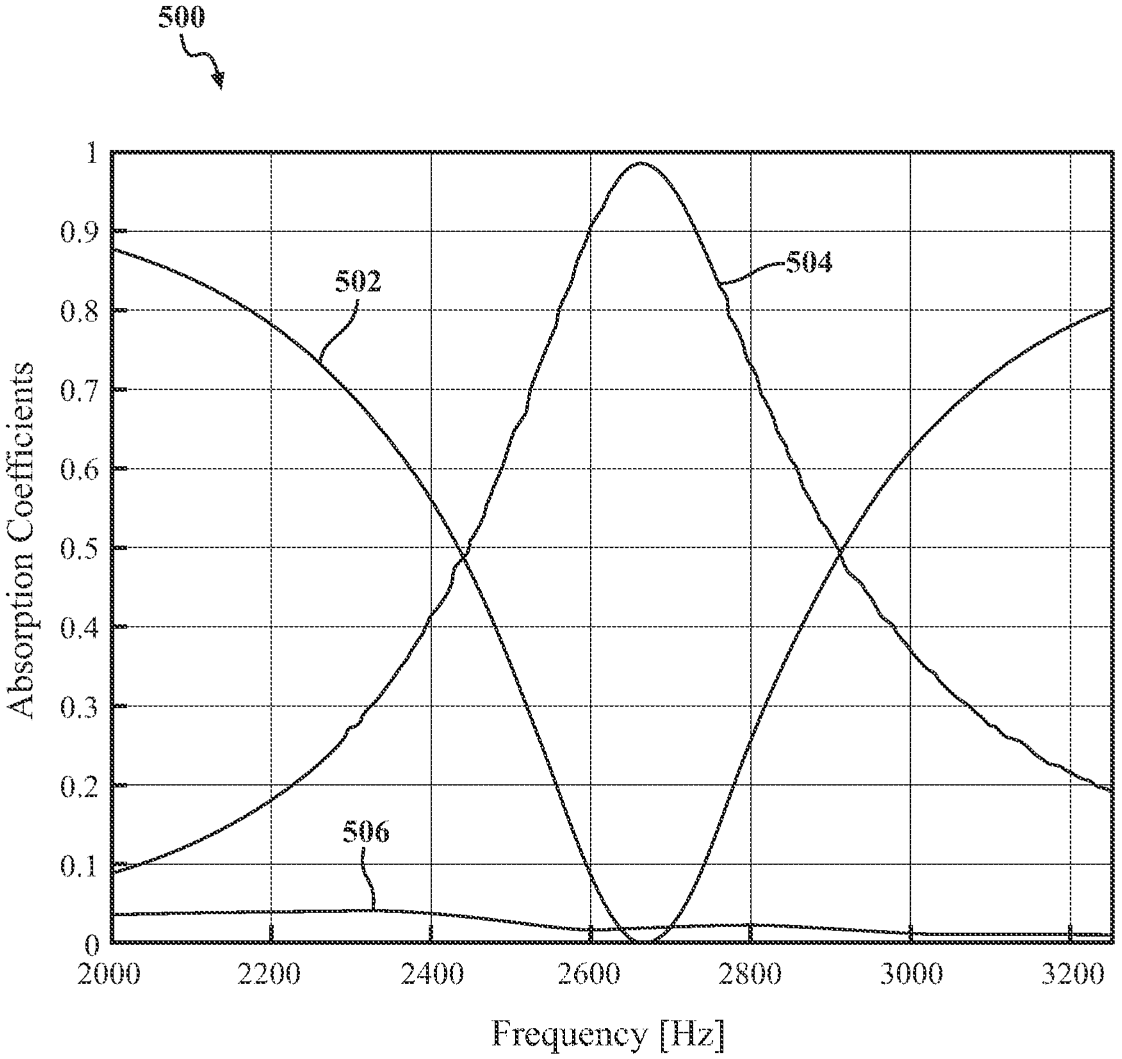

FIGS. 6A-6C generally discloses the performance of the system 100 of FIG. 2. Like before, the monopole scatterer 130 and the dipole scatterer 140 have a resonance near 2.7 kHz. The chart 300 of FIG. 6A illustrates the performance of the monopole scatterer 130, including the transmission 302, absorption 304, and reflection 306 of the flexural wave 112 acting upon the structure 120. The chart 400 of FIG. 6B illustrates the performance of the dipole scatterer 140, including the transmission 402, absorption 404, and reflection 406 of the flexural wave 112 acting upon the structure 120.

FIG. 6C illustrates what occurs when the monopole scatterer 130 and dipole scatterer 140 are attached to the structure 120. Here, the chart 500 illustrates the transmission 502, absorption 504, and reflection 506 of the flexural wave 112 acting upon the structure 120 across a wide range of frequencies. As shown in the chart 500, the absorption 504 is maximized at approximately 2.7 kHz, which substantially manages the resonant frequencies of the monopole scatterer 130 and dipole scatterer 140. Therefore, excellent absorption of the flexural wave 112 at or around 2.7 kHz can be achieved.

Figure 7:
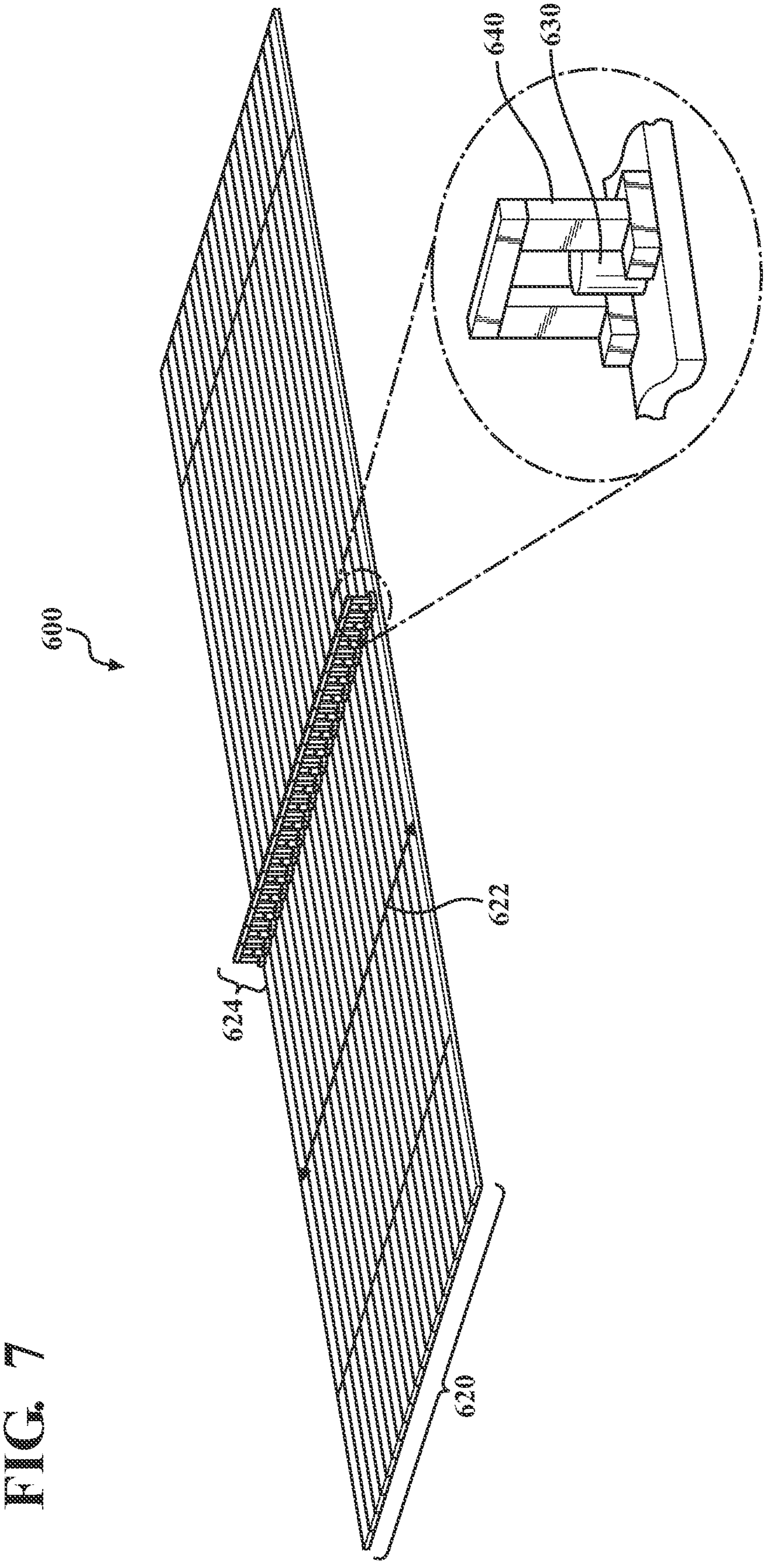
FIG. 7 illustrates a system for absorbing flexural waves acting on a structure when the structure is a plate.

The system 100 of FIG. 2 was applied to a structure as a beam. However, similar concepts can also be applied to much wider structures, such as plate-like structures. Moreover, FIG. 7 illustrates a system 600 applied to a structure as a plate 620. Here, a plurality 624 of monopole scatterers 630 and dipole scatterers 640 extend across the width 622 of the plate 620. The number of monopole scatterers 630 and dipole scatterers 640 may be based on the width 622, wherein a greater with or require more pairs of monopole scatterers 630 and dipole scatterers 640. It should be understood that the monopole scatterers 630 and the dipole scatterers 640 of this example may be similar to any of the monopole scatterers and/or dipole scatterers described in this description, such as the monopole scatterer 130 and the dipole scatterer 140.

Figure 8:
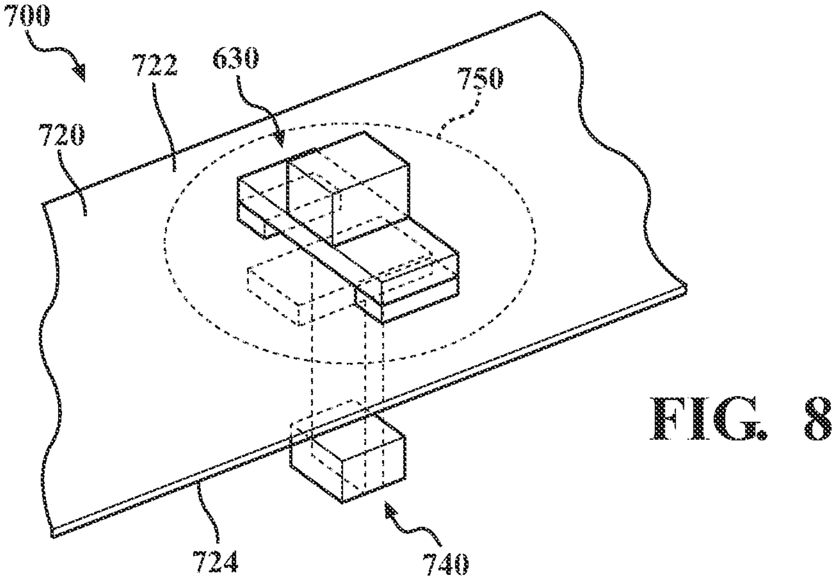
FIG. 8 illustrates another example of a system that can absorb flexural waves acting upon a structure that includes a dipole scatterer and a monopole scatterer attached to opposite sides of the structure.

As mentioned when describing the system 10 of FIG. 1, the monopole scatterer 30 and dipole scatterer 40 a be located on the same side of the structure or could be located on opposite sides, so long as a are generally located at the same location along the length of the structure. Again, the location can be where the scatterers overlap physically and/or so that their resonances originate at the location. FIG. 8 illustrates one example of a system 700 wherein a monopole scatterer 730 is attached to a top side 722 of the structure 720. In contrast, the dipole scatterer 740 is attached to the bottom side 724 of the structure 720.

Figure 9A:
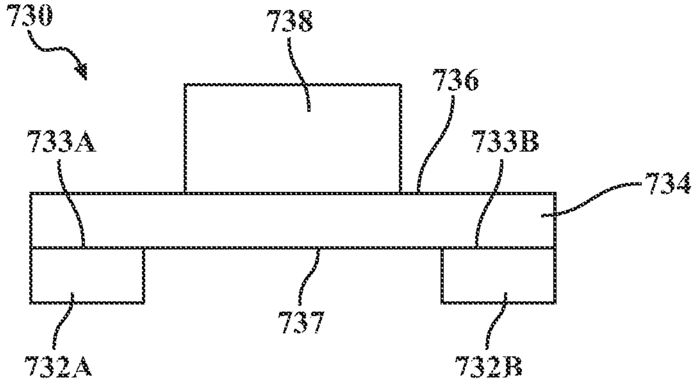
FIGS. 9A and 9B illustrate more detailed views of the monopole scatterer and the dipole scatterer, respectively, of FIG. 8.
Figure 9B:
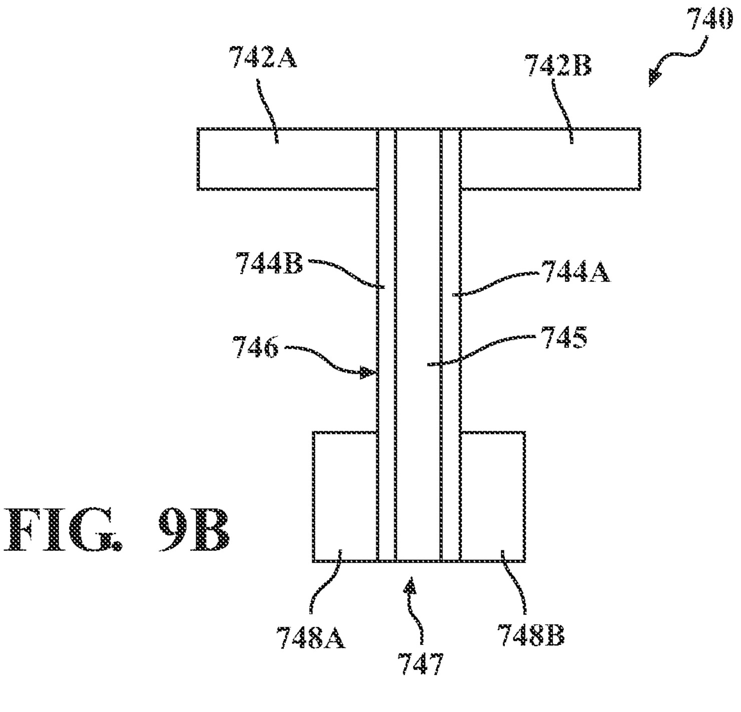

While the monopole scatterer 730 and/or the dipole scatterer 740 can take one of several different forms, reference is made to FIGS. 9A and 9B, which illustrate examples of these resonators, respectively. With attention to FIG. 9A, this figure illustrates one example of the monopole scatterer 730.

In this example, the monopole scatterer 730 includes a pair of supports 732A and 732B. Each of the supports 732A and 732B may be made of a rigid material and be cuboid. However, it should be understood that the supports 732A and 732B may take several different forms and be made of different materials that may be less rigid. Furthermore, in this example, the shapes, dimensions, and materials are nearly identical for the supports 732A and 732B. Still, it should also be understood that the shapes, dimensions, and materials may vary between the supports 732A and 732B.

A flexible material 734 with a top side 736 and a bottom side 737 extends between the two supports 732A and 732B. In this example, the bottom side 737 of the flexible material 734 is connected to and extends between the top sides 733A and 733B of the supports 732A and 732B, respectively. However, it should be understood that the flexible material 734 can extend to and from any portion of the supports 732A and 732B. The flexible material 734 acts as a spring and damper in a mass-spring-damper system and may be made of a flexible material, such as rubber and soft plastics, such as thermoplastic elastomers and/or thermoplastic polyurethane. However, the flexible material 734 may be made of any suitable material that allows the flexible material 734 to act as a spring and damper in a mass-spring-damper system.

A mass 738 is disposed on the top side 736 of the flexible material 734, generally in an area of the flexible material 734 unsupported by the supports 732A and 732B. Due to the flexible nature of the flexible material 734, when the structure 720 experiences vibrations and/or has flexural waves acting upon it, the mass 738 resonates. As such, the mass 738 is the mass in a spring-mass-damper system. Therefore, the resonance of the monopole scatterer 730 is based upon the mass of the mass 738 and the spring/damper characteristics of the flexible material 734. Depending on these variations, the natural resonance of the monopole scatterer 730 can vary considerably.

FIG. 9B illustrates a more detailed view of the dipole scatterer 740 of the system 700 of FIG. 8. Generally, the dipole scatterer 740 includes a member 746 that extends from the surface of the bottom side 724 of the structure 720 in a direction perpendicular to the plane defined by the surface of the bottom side 724. The member 746 should have some bending characteristics and essentially acts as the easy-to-bend structure 46 of FIG. 1 that acts as a bending spring. This may be accomplished by utilizing a low-stiffness material or thin thickness. In this example, the member 746 is made of several different materials to meet the bendability requirements of this application. However, it should be understood that the member 746 may be made of a single material. In this example, the member 746 is a sandwich-like structure wherein a rubber core 745 is sandwiched between two aluminum plates 744A and 744B.

A distal end 747 of the member 746, opposite the structure 720, may act as a mass. In this example, mass members 748A and 748B are attached to the distal end 747 and act as a mass for the dipole scatterer 740. Again, it should be understood that the members 746 and the mass members 748A and 748B may be made of separate or a single unitary component.

Opposite of the distal end 747 may include support members 742A and 742B that may support the member 746 to the structures 720. Again, support members 742A and 742B may be separate components from that of the member 746 or may be a single unitary component made along with the member 746 and/or the mass members 748A and 748B.

As mentioned before, the monopole scatterer 730 and the dipole scatterer 740 should be located at the same location 750 of the structure 720. The location 750 may be the location where the monopole scatterer 730 and the dipole scatterer 740 overlap each other along the length of the structure 720. Additionally or alternatively, the origins of the resonances produced by the monopole scatterer 730 and the dipole scatterer 740 should be adjacent to each other to have the desired effect of absorbing flexural waves acting upon the structure 720.

Figure 10:
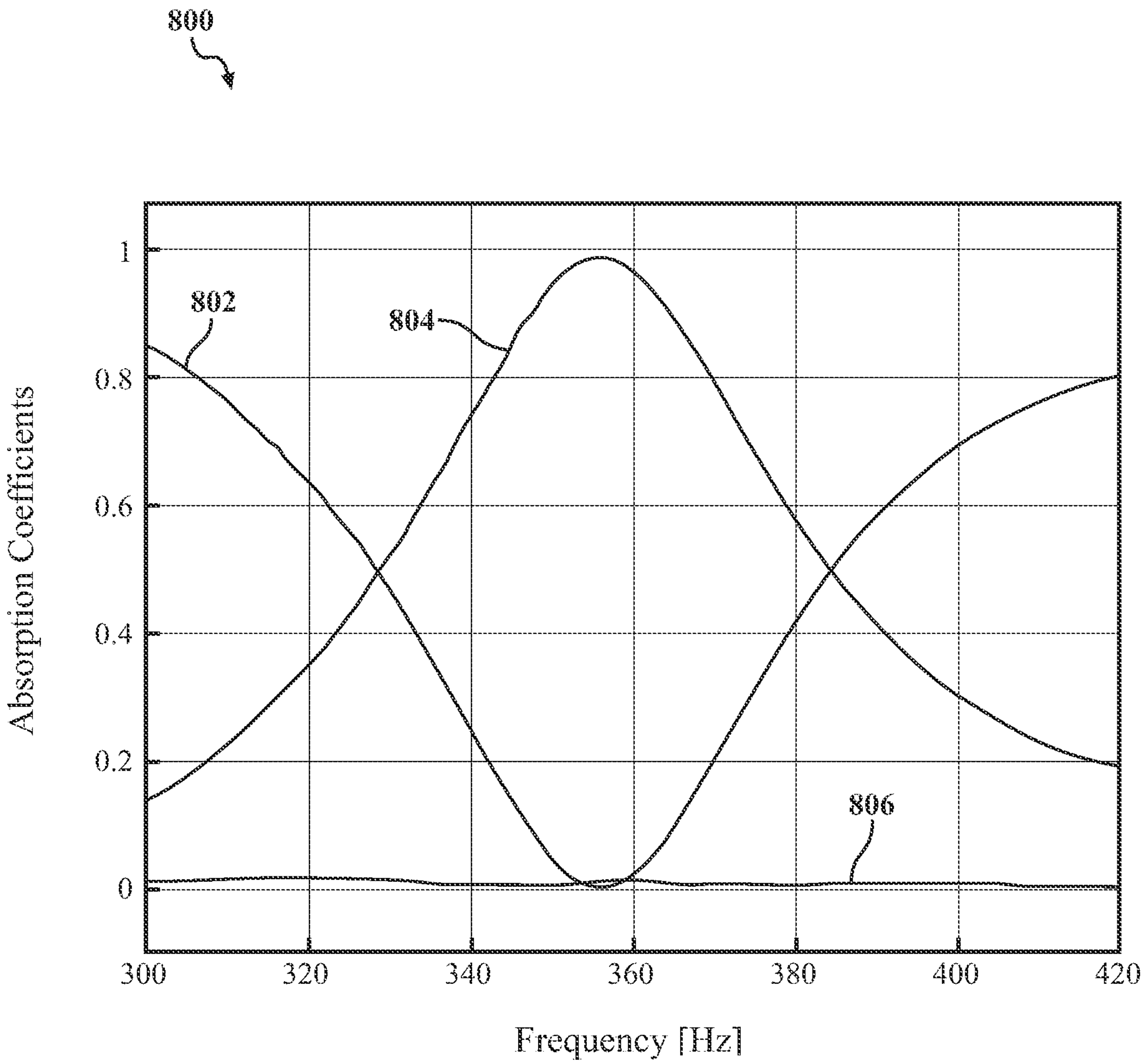
FIG. 10 illustrates the performance characteristics of the system for absorbing flexural waves of FIG. 8.

FIG. 10 illustrates a chart 800 showing the performance of the system 700 of FIG. 8. In this example, the resonant frequencies of the monopole scatterer 730 and the dipole scatterer 740 are approximately 350 Hz. Here, the chart 800 illustrates the transmission 802, the absorption 804, and the reflection 806 of a flexural wave acting upon the structure 720 across a broad frequency range. As expected, maximum absorption of flexural waves having a frequency of approximately 350 Hz is achieved.

The systems and devices described and illustrated in this description can achieve excellent absorption of flexural waves by utilizing a monopole scatterer and a dipole scatterer at the same location on the structure. Each of the scatterers is capable of absorbing 50% of the energy carried by the incident waves. When both are attached to the same location of the structure, the absorption adds up to 100%.

The preceding description is illustrative and does not intend to limit the disclosure, application, or use. The phrase at least one of A, B, and C should be construed to mean a logical (A or B or C), using a non-exclusive logical "or." Disclosure of ranges includes disclosure of all ranges and subdivided ranges within the entire range.

The headings (such as "Background" and "Summary") and sub-headings used herein are intended only for the general organization of topics within the present disclosure and are not intended to limit the disclosure of the technology or any aspect thereof. The recitation of multiple embodiments with stated features is not intended to exclude other embodiments with additional features or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in various forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referred to the same aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A system for absorbing a flexural wave acting upon a structure comprising a pair of scatterers, the pair of scatterers including a monopole scatterer disposed on the structure at a location and a dipole scatterer disposed on the structure at the location.

2. The system of claim 1, wherein the structure is a beam having a length and a width, wherein the location is a portion along the length of the beam.

3. The system of claim 1, wherein the monopole scatterer and the dipole scatterer have substantially similar resonant frequencies.

4. The system of claim 3, wherein a frequency of the flexural wave is substantially similar to resonant frequencies of the monopole scatterer and the dipole scatterer.

5. The system of claim 1, wherein the monopole scatterer and the dipole scatterer are disposed on a first side of the structure at the location.

6. The system of claim 1, wherein the monopole scatterer is disposed on a first side of the structure, and the dipole scatterer is disposed on a second side of the structure at the location.

7. The system of claim 1, wherein the dipole scatterer is configured to vibrate side to side along a length of the structure, and the monopole scatterer is configured to vibrate up and down relative to a surface of the structure.

8. The system of claim 1, wherein the structure is a beam.

9. The system of claim 1, wherein the structure is a plate.

10. The system of claim 9, further comprising multiple pairs of scatterers extending along a width of the plate.

11. The system of claim 1, wherein the monopole scatterer comprises:

a pair of supports separated from each other by a distance;

a flexible material extending between the supports; and a mass disposed on the flexible material.

12. The system of claim 1, wherein the monopole scatterer comprises:

a solid member acting as a mass; and a flexible member attached to a side of the solid member, the flexible member acting as a spring and damper.

13. The system of claim 12, wherein the flexible member is attached to the structure, the flexible member being located between the structure and the solid member.

14. The system of claim 1, wherein the dipole scatterer further comprises:

a support member extending perpendicularly from the location of the structure, the support member having a distal end opposite of the structure; and the distal end having a mass.

15. The system of claim 1, wherein the dipole scatterer further comprises:

a pair of support members extending from the location of the structure; and a mass member extending between the support members, wherein an open space is located between the pair of support members, the mass member, and a portion of the structure.

16. The system of claim 15, wherein the monopole scatterer is located, at least partially, within the open space.

17. A pair of scatterers for absorbing a flexural wave acting on a structure the pair of scatterers comprising:

a monopole scatterer; and a dipole scatterer, wherein the monopole scatterer and the dipole scatterer are configured to be mounted to the structure at a same location.

18. The pair of scatterers of claim 17, wherein the same location is such that the monopole scatterer and the dipole scatterer at least partially overlap each other along a length of the structure.

19. The pair of scatterers of claim 17, wherein the same location is such that an origin of a monopolar resonance produced by the monopole scatterer is located adjacent to an origin of a dipolar resonance produced by the dipole scatterer.

20. The pair of scatterers of claim 17, wherein the monopole scatterer and the dipole scatterer have resonant frequencies that are substantially similar to a frequency of the flexural wave.

* * * * *